US011590906B2

(12) United States Patent
Kotabe et al.

(10) Patent No.: US 11,590,906 B2
(45) Date of Patent: Feb. 28, 2023

(54) VEHICLE-MOUNTED SYSTEM

(71) Applicant: Hitachi Automotive Systems, Ltd., Hitachinaka (JP)

(72) Inventors: Akira Kotabe, Hitachinaka (JP); Shinya Matohara, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 518 days.

(21) Appl. No.: 16/956,319

(22) PCT Filed: Jan. 28, 2019

(86) PCT No.: PCT/JP2019/002641
§ 371 (c)(1),
(2) Date: Jun. 19, 2020

(87) PCT Pub. No.: WO2019/171814
PCT Pub. Date: Sep. 12, 2019

(65) Prior Publication Data
US 2020/0317144 A1 Oct. 8, 2020

(30) Foreign Application Priority Data
Mar. 6, 2018 (JP) .............................. JP2018-039768

(51) Int. Cl.
*B60R 16/02* (2006.01)
*B60R 16/023* (2006.01)
*G01F 1/698* (2006.01)

(52) U.S. Cl.
CPC .......... *B60R 16/023* (2013.01); *G01F 1/6986* (2013.01)

(58) Field of Classification Search
CPC ..... B60R 16/023; G01F 25/10; G01F 15/024; G01F 1/6965; G01F 1/6986; F02D 41/28; F02D 41/187; F02D 2041/281
See application file for complete search history.

(56) References Cited

U.S. PATENT DOCUMENTS 5,116,108 A * 5/1992 Sigi .......................... B60T 8/48
701/79
9,383,240 B2 * 7/2016 Kohno .................. G01F 1/6845
(Continued)

FOREIGN PATENT DOCUMENTS

| JP | 2000-105758 A | 4/2000 |
| JP | 2003-99417 A | 4/2003 |

(Continued)

OTHER PUBLICATIONS

International Search Report with English translation and Written Opinion issued in corresponding application No. PCT/JP2019/002641 dated May 14, 2019.

*Primary Examiner* — Behrang Badii
(74) *Attorney, Agent, or Firm* — Foley & Lardner LLP

(57) ABSTRACT

Provided is a vehicle-mounted system capable of transmitting a command to a first system from a second system during a period in which the first system communicates with the second system according to a unidirectional communication protocol. A vehicle-mounted system 100 includes a sensor 10 (first system) and an ECU (second system). The sensor 10 outputs a message signal including a pause pulse to the communication line DATA according to SENT (a unidirectional communication protocol). The ECU 20 is connected to the communication line DATA, and transmits a command to the sensor 10 using the falling period of the pause pulse.

15 Claims, 7 Drawing Sheets

(56) References Cited

U.S. PATENT DOCUMENTS

| | | | |
|---|---|---|---|
| 9,634,715 B2* | 4/2017 | Scheinkerman | H04L 67/12 |
| 9,720,873 B2* | 8/2017 | Drescher | G06F 13/426 |
| 2013/0105137 A1* | 5/2013 | Kohno | G01F 1/6845 |
| | | | 165/287 |
| 2015/0236746 A1* | 8/2015 | Scheinkerman | H04B 1/40 |
| | | | 375/219 |
| 2016/0098374 A1* | 4/2016 | Drescher | G06F 13/426 |
| | | | 710/313 |

FOREIGN PATENT DOCUMENTS

| JP | 2009-63471 A | 3/2009 |
|---|---|---|
| JP | 2009-184368 A | 8/2009 |
| JP | 2013-96800 A | 5/2013 |
| JP | 2016-76928 A | 5/2016 |
| JP | 2017-37093 A | 2/2017 |
| JP | 2018-25417 A | 2/2018 |

* cited by examiner

| | BEFORE RECEIVING DIAGNOSIS (UNDIAGNOSED) | AFTER RECEPTION |
|---|---|---|
| STATUS/ COMMUNICATION NIBBLE ZEROTH BIT | 0x0 | 0x1 |

FIG. 6
|  | BEFORE RECEIVING DIAGNOSIS (UNDIAGNOSED) | AFTER RECEPTION |
|---|---|---|
| DATA NIBBLES 1 TO 4 (16-BIT DATA) | SENSOR SIGNAL | 0xFFFF |
FIG. 7
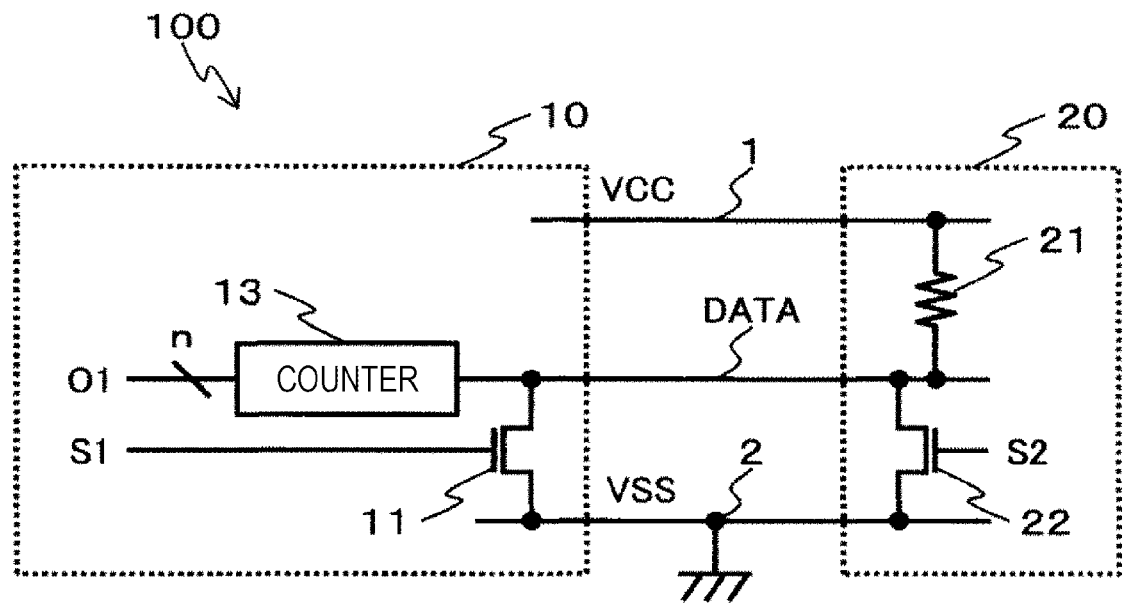
FIG. 8
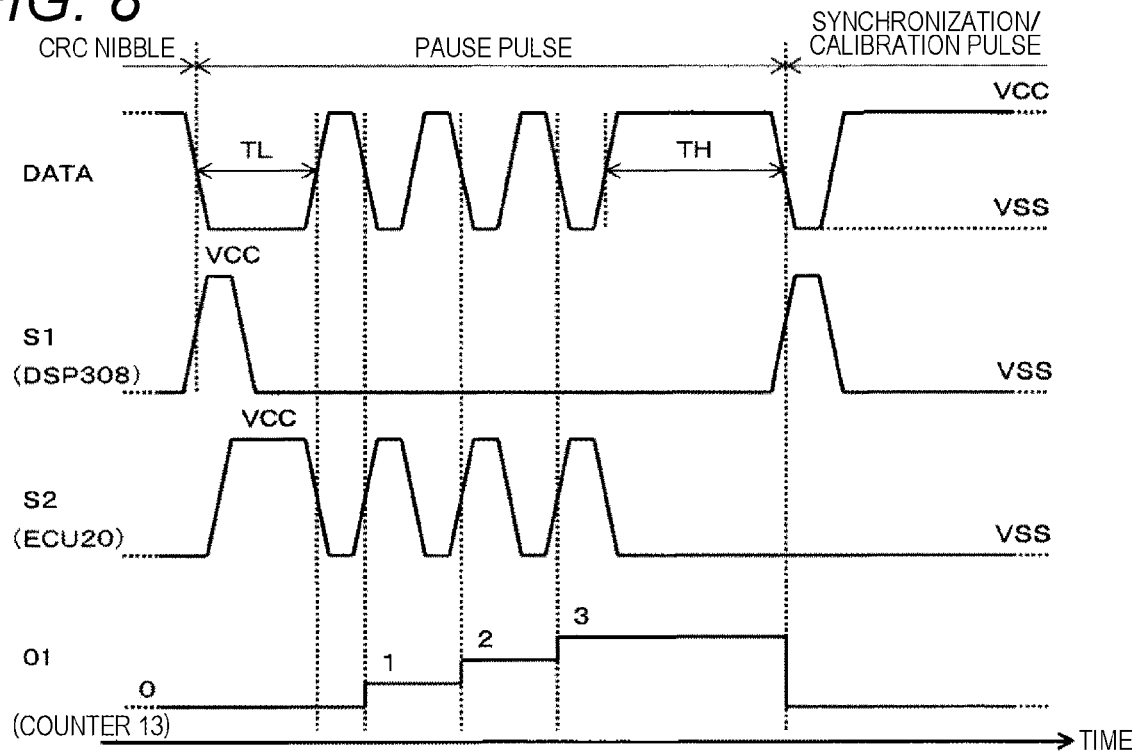

VEHICLE-MOUNTED SYSTEM

TECHNICAL FIELD

The present invention relates to a vehicle-mounted system

BACKGROUND ART

A communication scheme between a vehicle-mounted sensor and an engine control unit (hereinafter, referred to as the ECU) includes single edge nibble transmission (SENT) (for example, see PTL 1). The SENT communication is a unidirectional communication scheme from the sensor to the ECU, and can digitize and transmit a plurality of sensor signals using a single signal line and detect an error by CRC. Further, since no battery voltage is required during the communication, communication circuits mounted on the sensor and the ECU can be simplified.

CITATION LIST

Patent Literature

PTL 1: JP 2016-076928 A

SUMMARY OF INVENTION

Technical Problem

Since the above-described SENT communication is the unidirectional communication scheme, there is a problem that it is difficult to control the operation of the sensor (first system) by the ECU (second system).

An object of the present invention is to provide a vehicle-mounted system capable of transmitting a command to a first system from a second system during a period in which the first system communicates with the second system according to a unidirectional communication protocol.

Solution to Problem

In order to achieve the above object, the present invention is a vehicle-mounted system including a first system and a second system, in which the first system outputs a message signal including a pause pulse to a communication line according to a unidirectional communication protocol, and the second system is connected to the communication line, and transmits a command to the first system using a falling period of the pause pulse.

Advantageous Effects of Invention

According to the present invention, it is possible to transmit the command to the first system from the second system during the period in which the first system communicates with the second system according to the unidirectional communication protocol. Other objects, configurations, and effects which have not been described above become apparent from embodiments to be described hereinafter.

BRIEF DESCRIPTION OF DRAWINGS

FIG. 6 is a table showing another example of sensor output when the power supply to the heating resistor is stopped.
FIG. 7 is a circuit diagram for implementing a communication method according to a second embodiment.
FIG. 8 is a timing chart during communication according to the second embodiment, and is the timing chart when a control signal is transmitted from an ECU to a sensor.

DESCRIPTION OF EMBODIMENTS

Figure 10:
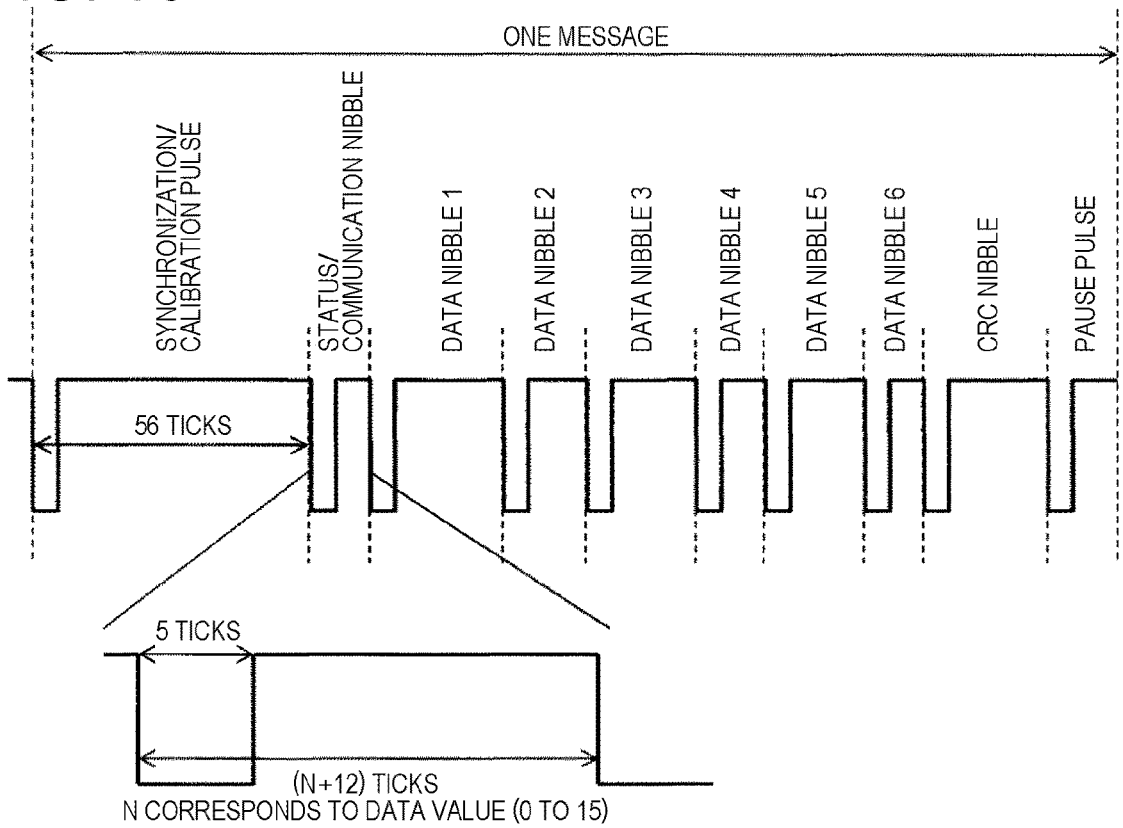
FIG. 10 is a view illustrating a communication waveform example of SENT communication.

Hereinafter, embodiments of the present invention will be described with reference to the drawings.
(SENT)
First, single edge nibble transmission (SENT), which is a unidirectional communication protocol used in the present embodiment, will be briefly described.
FIG. 10 is a view illustrating a communication waveform example of the SENT communication. The communication waveform includes ten pulses, and a transmission data value is expressed by the time from a fall to the next fall of each pulse. A tick in FIG. 10 is a basic time unit in the SENT communication, and is set to, for example, 3 us (microsecond). Further, nibbles correspond to 4-bit data. As illustrated in FIG. 10, the 4-bit data is expressed by changing a period from a fall to the next fall from 12 to 27 ticks according to a value of data to be transmitted (0 to 15).
A synchronization/calibration pulse is used to transmit both a synchronization signal and a tick value. A pulse width is fixed at 56 ticks, and the ECU calculates the tick value based on a width of the synchronization/calibration pulse. A status/communication nibble is used to serially output a sensor state, a plurality of sensor signals having a slow update cycle, and the like.
Data nibbles 1 to 6 are used to transmit the sensor signal. The data nibbles 1 to 6 can express 24-bit information. For example, in the case of an air flow sensor, 14 bits can be used to transmit an air flow signal and the remaining 10 bits can be used to transmit an intake air temperature signal. A CRC nibble is used to transmit a cyclic redundancy check value for the data nibbles 1 to 6.
Since pulse widths of the status/communication nibble, the data nibbles 1 to 6, and the CRC nibble change according to a data value, a length of one message of the SENT communication also changes. The pause pulse is used to keep the length of one message to be constant, for example, 282 ticks or the like. That is, the pause pulse is a pulse configured to keep the length of the message constant.

First Embodiment

A first embodiment is an embodiment in which an ECU adjusts a falling period of a pause pulse, and a sensor detects the falling period and receives and executes a control signal from the ECU.

Figure 1:
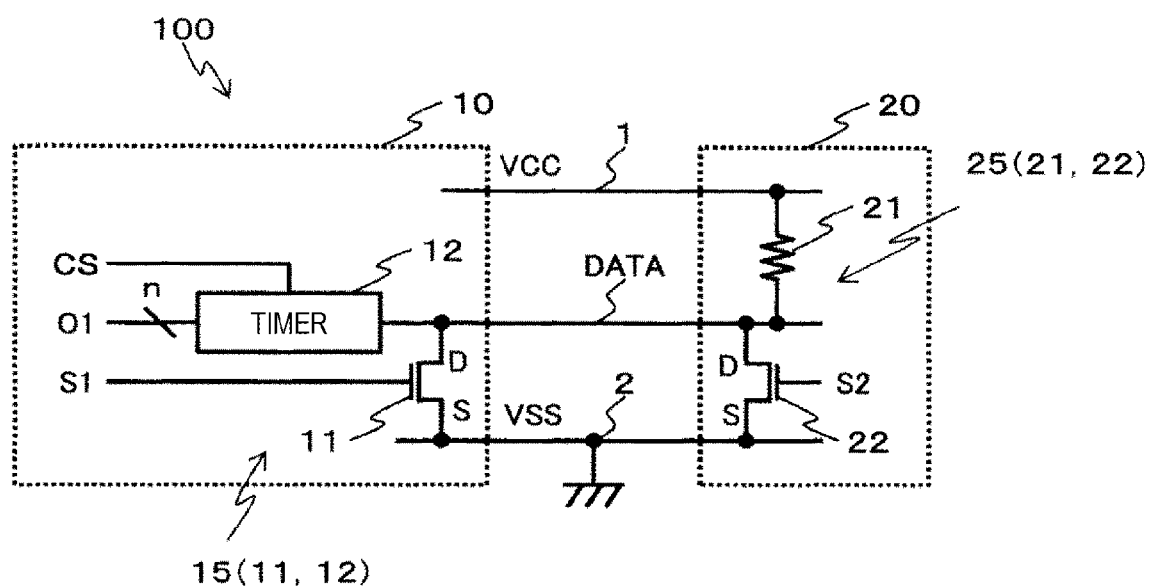
FIG. 1 is a circuit diagram for implementing a communication method according to a first embodiment.

FIG. 1 is a circuit diagram for implementing a communication method according to the first embodiment. A sensor 10 (sensor circuit) and an ECU 20 are connected by a power supply line 1, a ground power supply line 2, and a communication line DATA. Power is supplied from the ECU 20 to the sensor 10. Hereinafter, a power supply voltage is VCC and a ground power supply is VSS.

A vehicle-mounted system 100 according to the present embodiment includes the sensor 10 (first system) and the ECU 20 (second system). The sensor 10 outputs a message signal including a pause pulse to the communication line DATA according to SENT (a unidirectional communication protocol). The ECU 20 is connected to the communication line DATA, and transmits a command to the sensor 10 using the falling period of the pause pulse. Details thereof are as follows.

An input/output circuit 15 of the sensor 10 includes an output MOS transistor 11 and a timer 12. A drain, a source, and a gate of the output MOS transistor 11 are connected to the communication line DATA, the ground power supply line 2, and a control signal S1 (control line), respectively.

On the other hand, the timer 12 counts the number of rises of a control signal CS, and generates an n-bit output signal O1 corresponding to a falling period of the communication line DATA. A noise protection filter including a resistive element and a capacitive element may be provided between a terminal to which the communication line DATA is connected and the output MOS transistor 11.

An input/output circuit 25 of the ECU 20 includes a pull-up resistor 21 and an output MOS transistor 22. The pull-up resistor 21 is connected between the power supply line 1 and the communication line DATA. A drain, a source, and a gate of the output MOS transistor 22 are connected to the communication line DATA, the ground power supply line 2, and a control signal S2 (control line), respectively.

The pull-up resistor 21 may be provided in the sensor 10, or may be provided in both the ECU 20 and the sensor 10.

Figure 11:
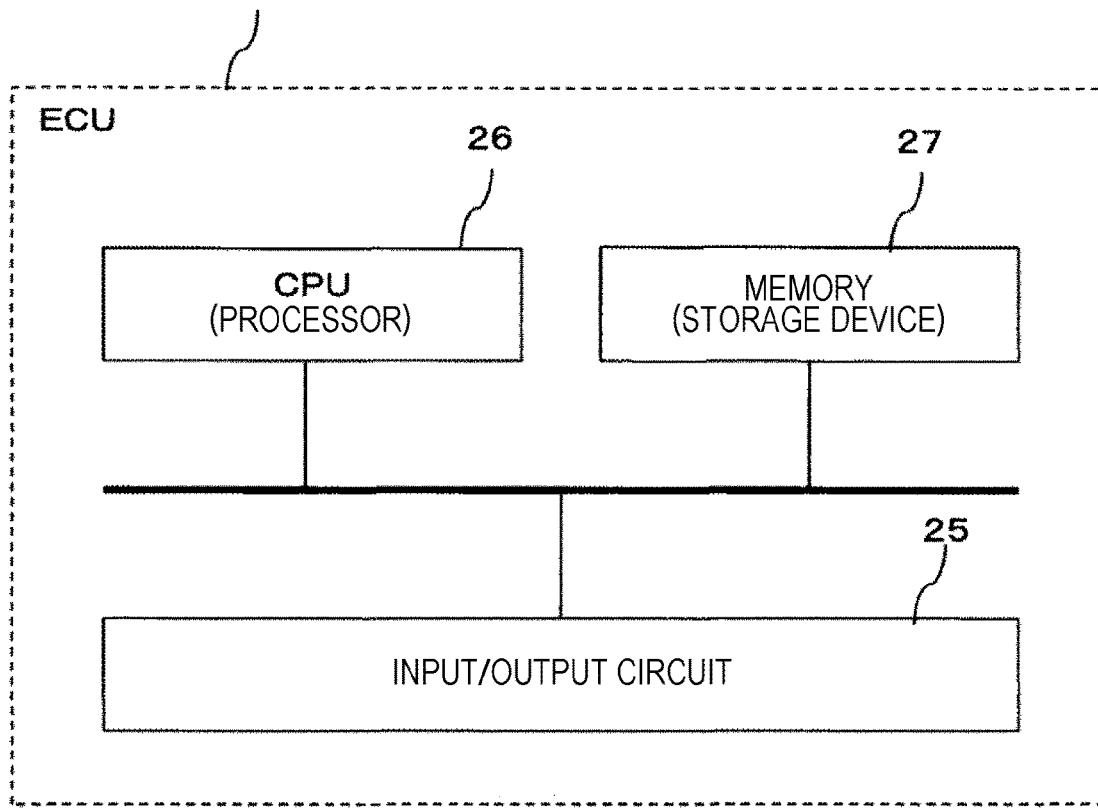
FIG. 11 is a block diagram illustrating a configuration of the ECU.

Incidentally, the ECU 20 includes a processor such as a central processing unit (CPU) 26, a storage device such as a memory 27, the input/output circuit 25, and the like as illustrated in FIG. 11. The CPU 26 of the ECU 20 implements various functions of the present embodiment by executing a predetermined program.

Figure 2:
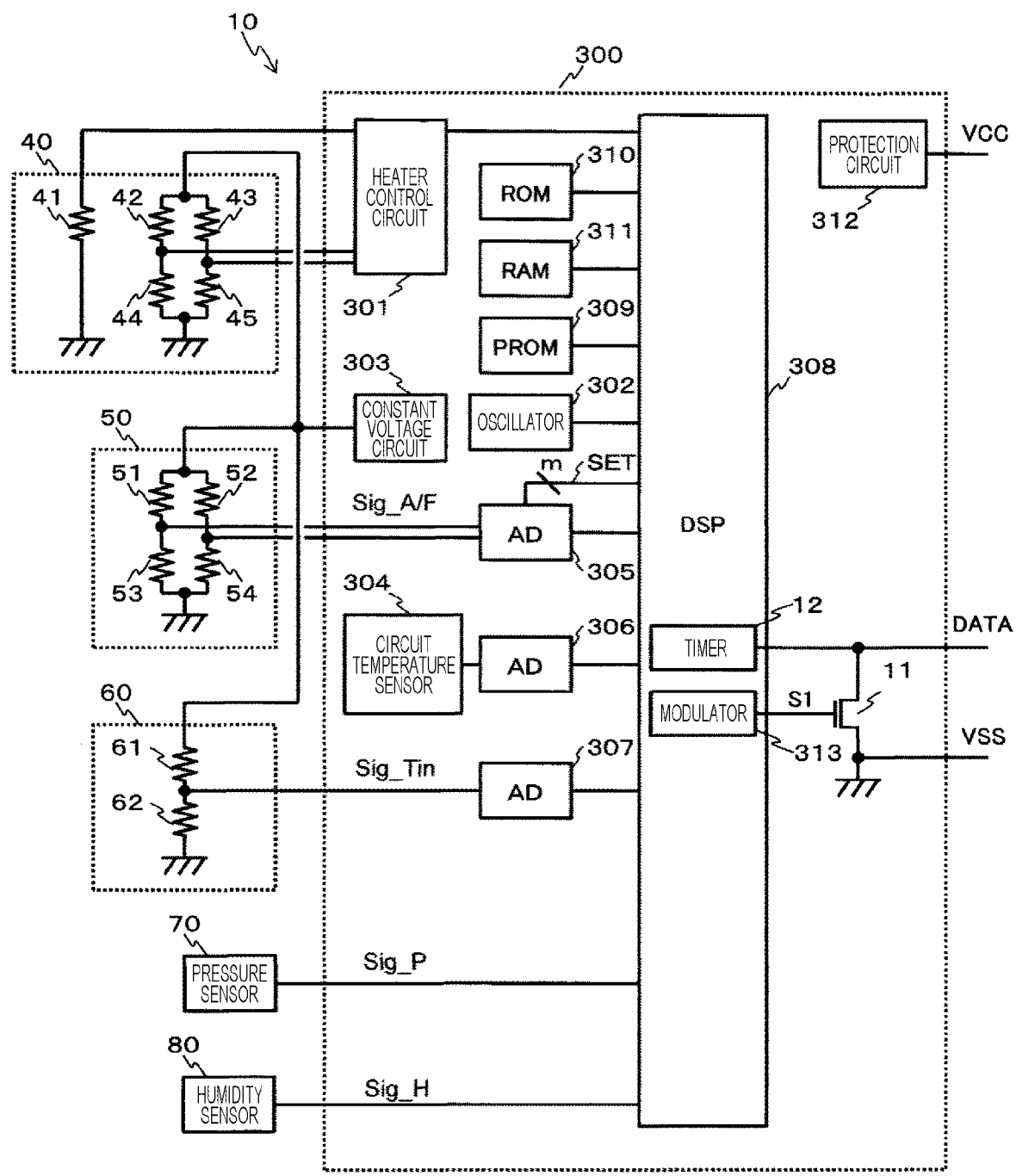
FIG. 2 is a block diagram of a sensor.

FIG. 2 is a block diagram of the sensor 10 to which the present invention is applied. The sensor 10 is an air flow sensor. The sensor 10 includes an output characteristic adjustment circuit 300, a constant temperature control bridge 40, a temperature difference bridge 50, an intake air temperature sensor 60, a pressure sensor 70, and a humidity sensor 80.

The output characteristic adjustment circuit 300 is a large scale integration (LSI) in which a heater control circuit 301 and an arithmetic function are integrated, and includes: an oscillator 302 (hereinafter, referred to as the OSC) that controls a synchronization timing of the entire circuit; a constant voltage circuit 303 which is a power supply that drives the constant temperature control bridge 40, the temperature difference bridge 50, the intake air temperature sensor 60, the pressure sensor 70, the humidity sensor 80, and the output characteristic adjustment circuit 300; a circuit temperature sensor 304 that detects a circuit temperature; an A/D converter 305 that converts an air flow signal Sig_A/F detected by the temperature difference bridge 50; an A/D converter 306 that converts an output signal of the circuit temperature sensor 304; an A/D converter 307 that converts an output signal Sig_Tin of the intake air temperature sensor 60; an arithmetic circuit 308 (a digital signal processor, hereinafter referred to as the DSP) serving as a processor that corrects the air flow signal Sig_A/F, the intake air temperature sensor signal Sig_Tin, a pressure sensor signal Sig_P, and a humidity sensor signal S_H; a storage circuit 309 (for example, a PROM) in which data necessary for characteristic adjustment of each sensor and an m-bit control signal SET for setting a conversion range of the A/D converter 305 are written; a ROM 310 that stores a program to control the DSP 308; a RAM 311 that temporarily stores intermediate data calculated by the DSP 308; a protection circuit 312 that protects each circuit when an excessive surge is applied to the power supply line 1; and the output MOS transistor 11. The DSP 308 includes the timer 12 and a modulator 313 that generates a SENT communication waveform.

The constant temperature control bridge 40 includes a heating resistor 41 (heater), a temperature-measuring resistor 42 for bridge circuit temperature measurement, a temperature-measuring resistor 43 for intake air temperature compensation, and fixed resistors 44 to 45. The heater control circuit 301 controls a current flowing to the heating resistor 41 such that a temperature difference between the temperature-measuring resistor 42 and the temperature-measuring resistor 43 for intake air temperature compensation becomes constant.

The temperature difference bridge 50 that detects the amount of heat released from the heating resistor 41 is arranged around the heating resistor 41 of the constant temperature control bridge 40. The temperature difference bridge 50 includes temperature-measuring resistors 51 to 54, and detects a flow rate and a direction of air.

The intake air temperature sensor 60 that measures an air temperature includes a fixed resistor 61 and a temperature-sensitive resistor 62 whose resistance value changes with temperature.

The pressure sensor 70 and the humidity sensor 80 are sensors configured to detect pressure and humidity, respectively, and are controlled by the DSP 308. For communication between each sensor and the DSP 308, SPI or I2C is used.

The air flow signal Sig_A/F detected by the temperature difference bridge 50 varies depending on individual circuits, and thus, needs to be adjusted so as to achieve a target output characteristic.

Further, each output of the intake air temperature sensor 60, the pressure sensor 70, and the humidity sensor 80 also needs to be adjusted to a target characteristic. Methods for the adjustment to the target output characteristic include adjustment using a second-order or higher-order polynomial and adjustment using a correction map. Further, the adjustment is performed in the state of being connected to an external computer.

Figure 3:
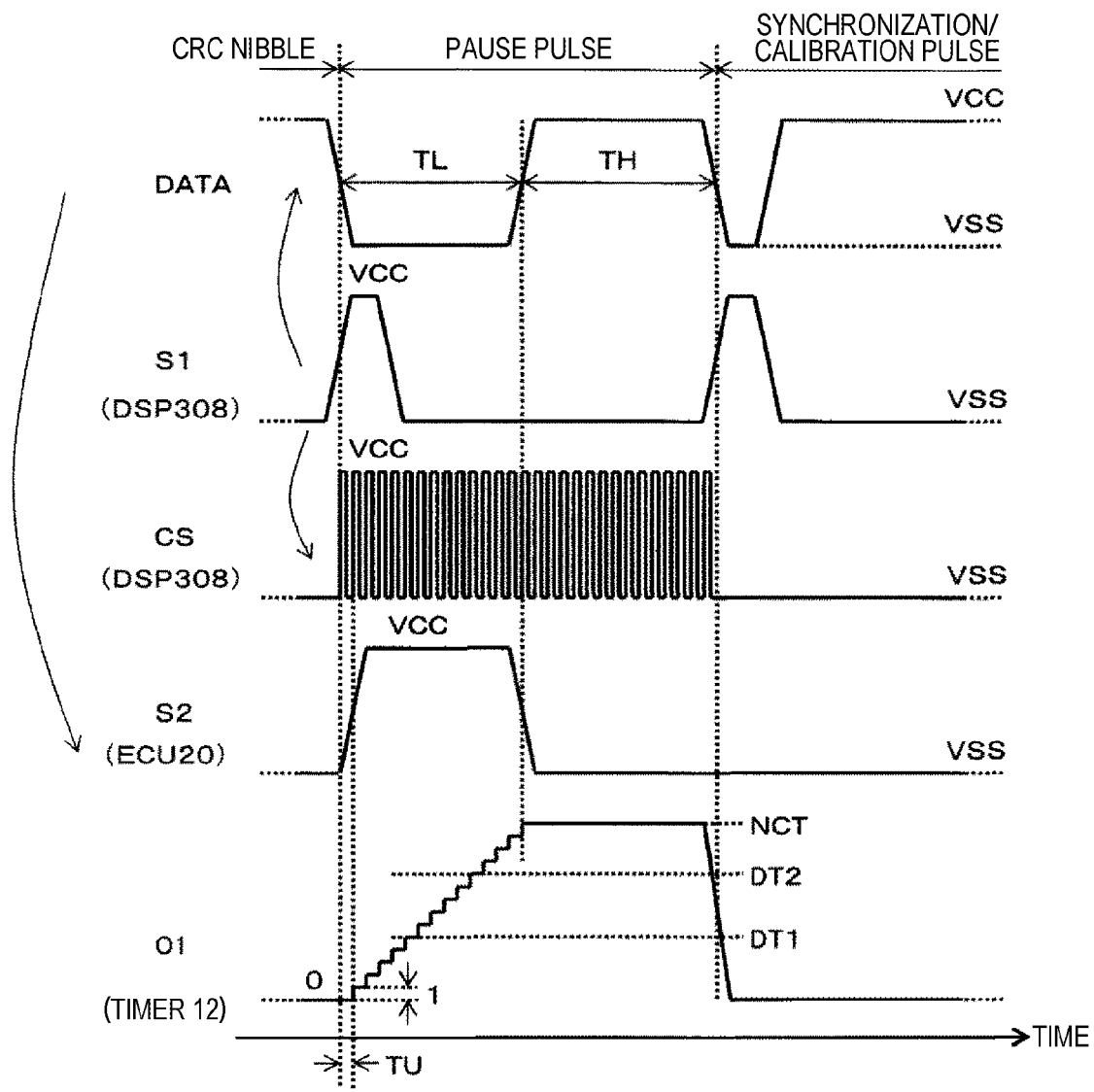
FIG. 3 is a timing chart during communication according to the first embodiment, and is the timing chart when a control signal is transmitted from an ECU to the sensor.

FIG. 3 is a timing chart during communication according to the first embodiment, and is the timing chart when a control signal S_fromECU is transmitted from the ECU to the sensor 10. FIG. 3 illustrates only the CRC nibble, the pause pulse, and the synchronization/calibration pulse in the SENT communication waveform in order to facilitate viewing of the drawing. Incidentally, the communication line DATA and the control signals S1, S2, and CS indicate voltage waveforms. On the other hand, the output signal O1 indicates an output digital value of the timer 12.

The communication line DATA is controlled by control signals S1 and S2, and a signal level swings between the power supply voltage VCC and the ground power supply VSS. On the other hand, signal levels of the control signals S1, S2, and CS also swing between the power supply voltage VCC and the ground power supply VSS. It is a matter of course that the signal levels of the control signals S1, S2, and CS may swing between an output voltage of the constant voltage circuit (for example, 303) mounted on the sensor 10 and the ECU 20 and the ground power supply VSS.

When the control signal S1 changes from an L level to an H level by the DSP 308 (modulator 313), the output MOS transistor 11 is turned on (conducted), and the communication line DATA changes from the H level to the L level. At the same time, the DSP 308 activates the control signal CS, and the timer 12 starts measuring a falling period TL of the pause pulse. A time interval TU of measurement time is defined by a cycle of an output waveform of the OSC 302 or a frequency division waveform thereof.

After detecting a fall of the pause pulse, the ECU 20 changes the control signal S2 from the L level to the H level and maintains the H level. When the control signal S2 becomes the H level, the output MOS transistor 22 is turned on (conducted), and a length of the falling period TL is controlled by the maintaining period. Even if the control signal S1 returns from the H level to the L level during this time, the communication line DATA is kept at the L level since the output MOS transistor 22 is turned on.

When the control signal S2 changes from the H level to the L level, the falling period TL is fixed. When the falling period TL exceeds a predetermined length, the sensor 10 determines that the control signal S_fromECU has been received.

This determination is made by the DSP 308. When a digital value NCT of the output signal O1 of the timer 12 after the falling period TL is fixed does not exceed a threshold DT1, the DSP 308 determines that the control signal S_fromECU has not been transmitted. The threshold DT1 is set to a value larger than the digital value NCT when the control signal S_fromECU is not transmitted from the ECU 20 to the sensor 10.

On the other hand, when the digital value NCT exceeds the threshold DT1, the DSP 308 determines that the control signal S_fromECU has been transmitted.

That is, when the digital value NCT corresponding to the falling period TL of the pause pulse is longer than the threshold DT1, the sensor 10 (first system) determines that the control signal S_fromECU (command) has been transmitted from the ECU 20 (second system). For example, when determining that the control signal S_fromECU (command) has been transmitted from the ECU 20 (second system), the sensor 10 (first system) stops the heater control circuit 301 to stop the heating resistor 41 (heater).

Here, the input/output circuit 15 of the sensor 10 outputs the message signal including the pause pulse to the communication line DATA according to the SENT (unidirectional communication protocol). When the digital value NCT corresponding to the falling period TL of the pause pulse becomes longer than the threshold DT1, the DSP 308 (processor) of the sensor 10 determines that the control signal S_fromECU (command) has been transmitted.

Conversely, the ECU 20 (second system) superimposes the control signal S_fromECU (command) on the pause pulse by making the digital value NCT corresponding to the falling period TL of the pause pulse longer than the threshold DT1.

Here, the input/output circuit 25 of the ECU 20 is connected to the communication line DATA to which the sensor 10 outputs the message signal including the pause pulse according to the SENT (unidirectional communication protocol). The processor 26 of the ECU 20 superimposes control signal S_fromECU (command) to the sensor 10 on the pause pulse by controlling the input/output circuit 25 to make the digital value NCT corresponding to the falling period TL of the pause pulse longer than the threshold DT1.

The input/output circuit 25 of the ECU 20 includes the output MOS transistor 22 (transistor) provided on a path between the communication line DATA and the ground. The processor 26 of the ECU 20 turns on (conducts) the output MOS transistor 22 to lengthen the falling period TL of the pause pulse.

The ECU 20 (second system) may superimposes the control signal S_fromECU (command) on the pause pulse after the CRC nibble (CRC pulse) when determining that an engine (power source) of a vehicle is in an idle state for example.

The DSP 308 can change an operation to be performed between the case where the digital value NCT exceeds the threshold DT1 and the case where the digital value NCT exceeds a threshold DT2. Since the plurality of thresholds are provided, it is possible to increase types of the control signal S_fromECU that can be transmitted from the ECU 20 to the sensor 10.

That is, the ECU 20 (second system) sets a content of the control signal S_fromECU (command) by the length of the falling period TL of the pause pulse. For example, the control signal S_fromECU may mean a command to stop the heater control circuit 301 when the length of the falling period TL of the pause pulse exceeds the threshold DT1, and the control signal S_fromECU may mean a command to stop the pressure sensor 70 when the length of the falling period TL of the pause pulse exceeds the threshold DT2. Conversely, the sensor 10 (first system) executes a predetermined process (stop of the heater control circuit 301, stop of the pressure sensor 70, and the like) according to the length of the falling period TL of the pause pulse.

When determining that the control signal S_fromECU has been transmitted, the DSP 308 maintains the control signal S1 at the L level to keep the communication line DATA at the H level for a predetermined rising period TH, and then, changes the control signal S1 from the L level to the H level to generate the synchronization/calibration pulse on the communication line. It is desirable that the rising period TH be secured for a time required for the ECU 20 to transition from a transmission state to a reception state or longer.

At the same time when the control signal S1 is changed from the L level to the H level, the DSP 308 deactivates the control signal CS. When the control signal CS is deactivated, the timer 12 is also deactivated, and the digital value of the output signal O1 is reset to zero.

Figures 4, 5:
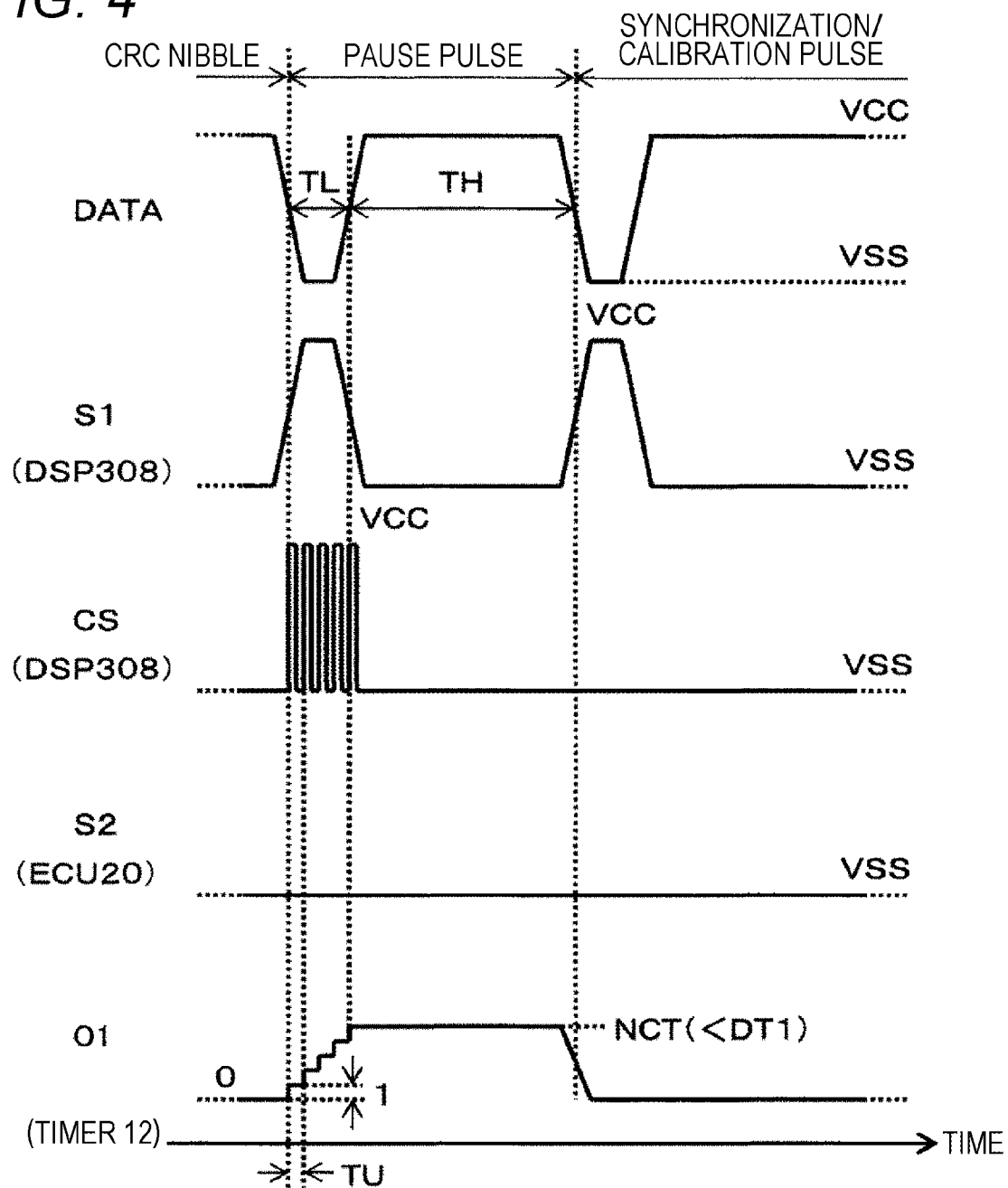
FIG. 4 is a timing chart during communication according to the first embodiment, and is the timing chart when the control signal is not transmitted from the ECU to the sensor.
FIG. 5 is a table showing an example of sensor output when power supply to a heating resistor is stopped.

FIG. 4 is a timing chart during communication according to the first embodiment, and is the timing chart when the control signal S_fromECU is not transmitted from the ECU 20 to the sensor 10. When the ECU 20 does not transmit the control signal to the sensor 10, the ECU 20 keeps the control signal S2 at the L level. For this reason, the digital value NCT does not exceed the threshold DT1, and thus, the DSP 308 determines that the control signal S_fromECU has not been transmitted.

Thereafter, the DSP 308 controls the control signal S1 such that the sum of the falling period TL and the rising period TH is adjusted and the length of one message becomes constant.

Next, an operation performed when the sensor 10 receives the control signal S_fromECU will be described. For example, the DSP 308 may change an input range of the A/D converter 305 according to the control signal SET for setting the conversion range of the A/D converter 305.

That is, when determining that the control signal S_fromECU (command) has been transmitted from the ECU 20 (second system), the sensor 10 (first system) may change the input range of the A/D converter 305 according to the control signal S_fromECU.

When the A/D converter 305 has a preamplifier at the input, the DSP 308 may change a gain of the preamplifier by the control signal SET. As a result, it is possible to maintain and improve the resolution of an output digital value of the A/D converter 305 even in a situation where an output signal of the temperature difference bridge 50 is small.

The DSP 308 may stop a clock signal supplied to the pressure sensor 70 and the humidity sensor 80 or transmit a control signal for setting the pressure sensor 70 and the humidity sensor 80 in a standby state to the pressure sensor 70 and the humidity sensor 80. That is, when determining that the control signal S_fromECU (command) has been transmitted from the ECU 20 (second system), the sensor 10 (first system) may stop the clock signal supplied to the pressure sensor 70 and the humidity sensor 80 or set the pressure sensor 70 and the humidity sensor 80 in the standby state.

Further, when the humidity sensor 80 includes a heating resistor, the DSP 308 may transmit a control signal for stopping power supply to the heating resistor to the humidity sensor 80. With these operations, the current consumption of the sensor 10 can be reduced.

The DSP 308 may stop the heater control circuit 301 to stop the current supply to the heating resistor 41. It is possible to mitigate a change in characteristics against a contaminated material (contamination of the heating resistor 41 due to a thermophoretic force). The sensor output may be fixed so as to know the stop of the power supply to the heating resistor 41. FIGS. 5 and 6 are tables showing examples of the sensor output when the power supply to the heating resistor 41 is stopped.

FIG. 5 illustrates an example in which the zeroth bit (least significant bit) of the status/communication nibble is fixed to 1 (0x1). It is a matter of course that the first bit may be fixed to 1, or both the zeroth bit and the first bit may be fixed to 1 (0x1). Incidentally, 0x means a hexadecimal number. FIG. 6 illustrates an example in which a value of each data nibble is fixed to 0xF when the air flow signal Sig_A/F is allocated to 16 bits of the data nibbles 1 to 4.

That is, a message includes a plurality of data nibbles (data) to which the air flow signal Sig_A/F indicating the air flow is allocated. For example, the sensor 10 (first system) fixes at least one data nibble (data) to a predetermined value after stopping the heating resistor 41 (heater).

The ECU 20 can correctly determine that the control signal S_fromECU has been transmitted by fixing a part of the sensor output when the sensor 10 has received the control signal S_fromECU.

With the operation that has been described above, the sensor 10 can be controlled by the ECU 20. Although it is configured such that the control signal S_fromECU is transmitted from the ECU 20 to the sensor 10 by adjusting the length of the falling period TL in the present embodiment, it may be configured to use waveforms having inverted polarities of the communication line DATA and the control signals CS, S1, and S2 illustrated in FIG. 3 and adjust a length of the rising period TH.

The falling period TL may be a multiple of one tick. Since the sensor 10 and the ECU 20 share one-tick information by the synchronization/calibration pulse, the sensor 10 can accurately measure the falling period TL by the timer 12.

Although the falling period TL of the pause pulse is controlled, the falling period TL of any one of the data nibbles 1 to 6 and the CRC nibble may be controlled. Since the control signal is allocated to each of data nibbles 1 to 6 and the CRC nibble, the length of one message can be reduced as compared with a case where a plurality of thresholds are provided.

According to the present embodiment, the command can be transmitted from the ECU 20 to the sensor 10 during the period in which the sensor 10 (first system) communicates with the ECU 20 (second system) according to the unidirectional communication protocol.

Second Embodiment

A second embodiment is an embodiment in which the sensor 10 detects that the ECU 20 adjusts the falling period TL of a pause pulse and falls the communication line DATA a plurality of times so as to receive and execute the control signal S_fromECU from the ECU 20.

FIG. 7 is a circuit diagram for implementing the second embodiment. This is a configuration in which the timer 12 used in the configuration of FIG. 1 is replaced with a counter 13, and the other configuration is the same as that of FIG. 1.

FIG. 8 is a timing chart during communication according to the second embodiment, and is the timing chart when the control signal S_fromECU is transmitted from the ECU 20 to the sensor 10. FIG. 8 illustrates only a CRC nibble, the pause pulse, and a synchronization/calibration pulse in a SENT communication waveform in order to facilitate viewing of the drawing. Incidentally, the communication line DATA and the control signals S1 and S2 indicate voltage waveforms. On the other hand, the output signal O1 indicates an output digital value of the counter 13.

When the control signal S1 changes from an L level to an H level by the DSP 308 (modulator 313), the output MOS transistor 11 is turned on (conducted), and the communication line DATA changes from the H level to the L level. When the ECU 20 transmits the control signal S_fromECU to the sensor 10, the ECU 20 changes the control signal S2 from the L level to the H level and maintains the H level after detecting a fall of the pause pulse When the control signal S2 becomes the H level, the output MOS transistor 22 is turned on (conducted), and a length of the falling period TL is controlled by the maintaining period. Even if the control signal S1 returns from the H level to the L level during this time, the communication line DATA is kept at the L level since the output MOS transistor 22 is turned on.

When the control signal S2 changes from the H level to the L level, the falling period TL is fixed. When the falling period TL exceeds a predetermined length, the sensor 10 waits for reception of the control signal S_fromECU, and the counter 13 is activated. Thereafter, the counter 13 counts the number of times the communication line DATA falls by the ECU 20. The sensor 10 determines a content of the control signal S_fromECU according to a digital value of the counter output O1, and performs a corresponding operation. The output digital value of the counter 13 is fixed when an H-level period TH of the communication line DATA has become a certain length or more. After the output digital value of the counter 13 is fixed, the synchronization/calibration pulse is started by the control signal S1.

Conversely, the ECU 20 (second system) superimposes the control signal S_fromECU (command) on the pause pulse by increasing the number of falls of the pause pulse. Specifically, the ECU 20 (second system) sets a content of the control signal S_fromECU (command) by the number of falls of the pause pulse. For example, the control signal S_fromECU may mean a command to stop the heater control circuit 301 when the number of falls of the pause pulse is 1, and the control signal S_fromECU may mean a command to stop the pressure sensor 70 when the number of falls of the pause pulse is two. Conversely, the sensor 10 (first system) executes a predetermined process (stop of the heater control circuit 301, stop of the pressure sensor 70, and the like) according to the number of falls of the pause pulse.

Figure 9:
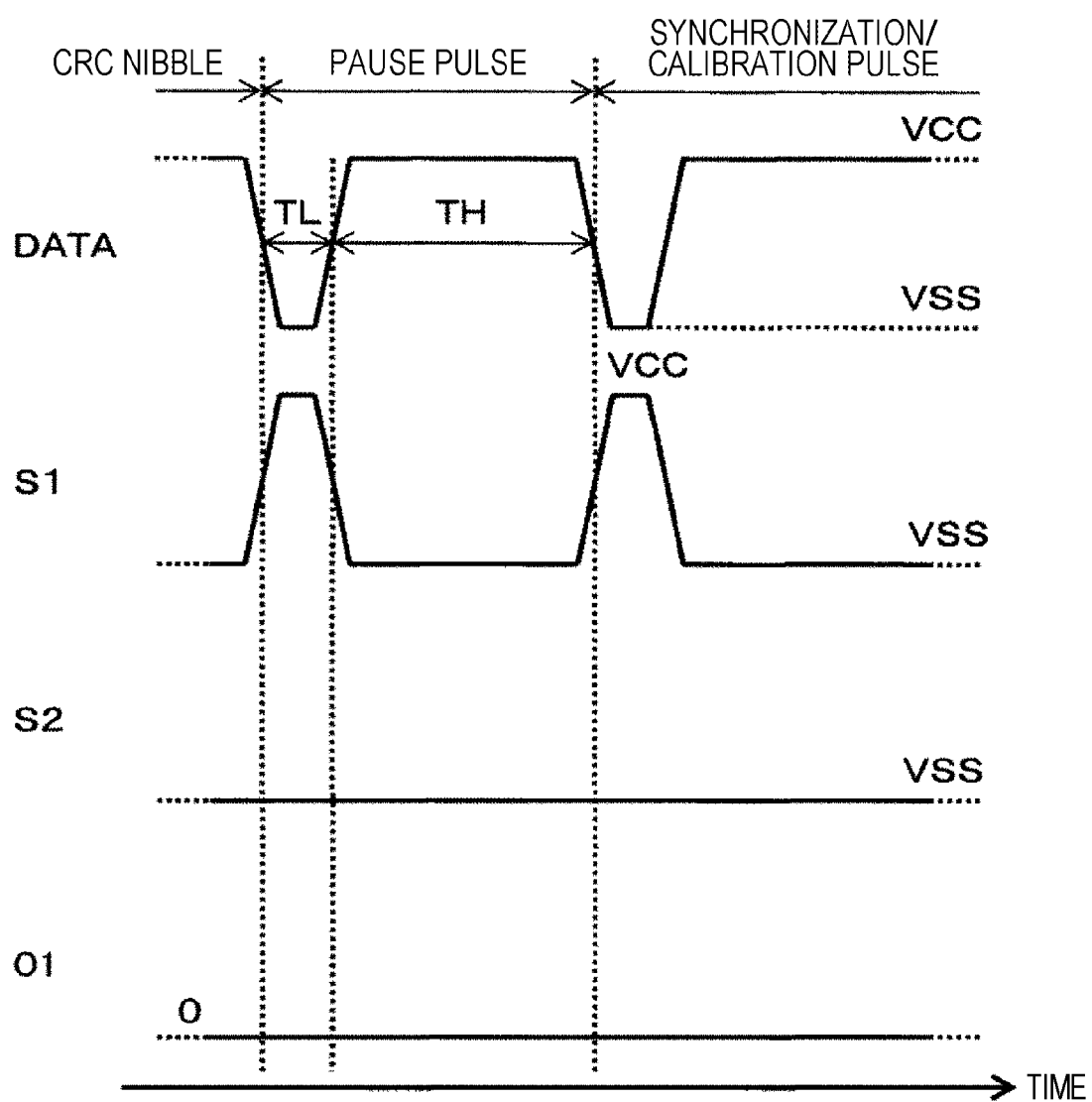
FIG. 9 is a timing chart during communication according to the second embodiment, and is the timing chart when the control signal is not transmitted from the ECU to the sensor.

FIG. 9 is a timing chart during communication according to the second embodiment, and is the timing chart when the control signal S_fromECU is not transmitted from the ECU 20 to the sensor 10.

When the control signal S1 changes from an L level to an H level by the DSP 308 (modulator 313), the output MOS transistor 11 is turned on (conducted), and the communication line DATA changes from the H level to the L level. When the ECU 20 does not transmit the control signal to the sensor 10, the ECU 20 keeps the control signal S2 at the L level. For this reason, the sensor 10 does not enter the state of waiting for reception of the control signal S_fromECU. Thereafter, the DSP 308 controls the control signal S1 such that the sum of the falling period TL and the rising period TH is adjusted and the length of one message becomes constant.

With the operation that has been described above, the control signal S_fromECU can be transmitted from the ECU 20 to the sensor 10. In the present embodiment, the control signal CS required in the first embodiment becomes unnecessary. Further, a driving cycle of the communication line DATA is longer than a cycle of the control signal CS, and thus, the counter 13 does not need to operate at high speed and can be downsized.

Although it is configured such that the length of the falling period TL is adjusted and the number of falls is counted in the present embodiment, it may be configured to use waveforms having inverted polarities of the communication line DATA and the control signals S1 and S2 illustrated in FIG. 7, adjust a length of the rising period TH, and count the number of rises. Further, the falling period TL and the rising period TH may be a multiple of one tick. Since the sensor 10 and the ECU 20 share one-tick information by the synchronization/calibration pulse, the sensor 10 can accurately measure the falling period TL and the rising period TH.

According to the present embodiment, the command can be transmitted from the ECU 20 to the sensor 10 during the period in which the sensor 10 (first system) communicates with the ECU 20 (second system) according to the unidirectional communication protocol.

Incidentally, the invention is not limited to the above-described embodiments and includes various modifications. For example, the above-described embodiments have been described in detail in order to describe the present invention in an easily understandable manner, and are not necessarily limited to one including the entire configuration that has been described above.

The sensor 10 (first system) is the air flow sensor in the above embodiments, but may be another sensor such as a pressure sensor or a temperature sensor. The output MOS transistors 11 and 22 are used as the transistors in the above embodiments, but other transistors (switches) such as bipolar transistors may be used. The ECU 20 is the engine control unit in the above embodiments, but may be an electronic control unit that controls another device.

Further, some configurations of a certain embodiment can be substituted by configurations of another embodiment, and further, a configuration of another embodiment can be also added to a configuration of a certain embodiment. Further, addition, deletion, or substitution of other configurations can be made with respect to some configurations of each embodiment.

Further, a part or all of each of the above-described configurations, functions, and the like may be realized, for example, by hardware by designing with an integrated circuit and the like. Further, each of the above-described configurations, functions, and the like may also be realized by software by causing a processor to interpret and execute a program for realizing each of the functions. Information such as programs, tables, and files that realize the respective functions can be installed in a recording device such as a memory, a hard disk, and a solid state drive (SSD), or a recording medium such as an IC card, an SD card, and a DVD.

REFERENCE SIGNS LIST

1 power supply line
2 ground power supply line
10 sensor
11 output MOS transistor
12 timer
15 input/output circuit
20 ECU
21 pull-up resistor
22 output MOS transistor
23 timer
25 input/output circuit
26 CPU
27 memory
100 vehicle-mounted system
300 output characteristic adjustment circuit
301 heater control circuit
302 oscillator
303 constant voltage circuit
304 circuit temperature sensor
305 A/D converter
306 A/D converter
307 A/D converter
308 DSP
309 PROM
310 ROM
311 RAM
312 protection circuit
40 constant temperature control bridge
41 heating resistor
42 temperature-measuring resistor
43 temperature-measuring resistor
44 fixed resistor
45 fixed resistor
50 temperature difference bridge
51 temperature-measuring resistor
52 temperature-measuring resistor
53 temperature-measuring resistor
54 temperature-measuring resistor
60 intake air temperature sensor
61 fixed resistor
62 temperature-sensitive resistor
70 pressure sensor
80 humidity sensor

The invention claimed is:

1. A vehicle-mounted system comprising a first system and a second system, wherein
the first system outputs a message signal including a pause pulse to a communication line according to a unidirectional communication protocol, and the second system is connected to the communication line, and transmits a command to the first system using a falling period of the pause pulse.

2. The vehicle-mounted system according to claim 1, wherein
the second system superimposes the command on the pause pulse by making the falling period of the pause pulse longer than a threshold.

3. The vehicle-mounted system according to claim 2, wherein
the second system sets a content of the command by a length of the falling period of the pause pulse.

4. The vehicle-mounted system according to claim 2, wherein
the second system superimposes the command on the pause pulse by increasing a number of falls of the pause pulse.

5. The vehicle-mounted system according to claim 4, wherein
the second system sets a content of the command using a number of falls of the pause pulse.

6. The vehicle-mounted system according to claim 2, wherein
the first system determines that the command has been transmitted from the second system when the falling period of the pause pulse is longer than the threshold.

7. The vehicle-mounted system according to claim 6, wherein
the first system executes a predetermined process according to a length of the falling period of the pause pulse.

8. The vehicle-mounted system according to claim 6, wherein
the first system executes a predetermined process according to a number of falls of the pause pulse.

9. The vehicle-mounted system according to claim 6, wherein
the first system is an air flow sensor including a heater, and stops the heater when determining that the command has been transmitted from the second system.

10. The vehicle-mounted system according to claim 9, wherein
the message includes a plurality of pieces of data to which an air flow signal indicating an air flow rate is allocated, and
the first system fixes at least one of the pieces of data at a predetermined value after stopping the heater.

11. The vehicle-mounted system according to claim 9, wherein
the second system superimposes the command on the pause pulse after a CRC pulse when determining that a power source of a vehicle is in an idle state.

12. The vehicle-mounted system according to claim 9, wherein
the first system includes an A/D converter, and changes an input range of the A/D converter according to the command when determining that the command has been transmitted from the second system.

13. The vehicle-mounted system according to claim 9, wherein
the first system includes a pressure sensor and a humidity sensor, and stops a clock signal supplied to the pressure sensor and the humidity sensor or sets the pressure sensor and the humidity sensor in a standby state when determining that the command has been transmitted from the second system.

14. The vehicle-mounted system according to claim 1, wherein
the pause pulse is a pulse configured to keep a length of the message constant.

15. The vehicle-mounted system according to claim 1, wherein
the communication protocol is SENT.

* * * * *